(12) United States Patent
Hayenga et al.

(10) Patent No.: US 9,582,282 B2
(45) Date of Patent: Feb. 28, 2017

(54) PREFETCHING USING A PREFETCH LOOKUP TABLE IDENTIFYING PREVIOUSLY ACCESSED CACHE LINES

(71) Applicant: ARM Limited, Cambridge (GB)

(72) Inventors: Mitchell Bryan Hayenga, Austin, TX (US); Christopher Daniel Emmons, Austin, TX (US)

(73) Assignee: ARM Limited, Cambridge (GB)

( * ) Notice: Subject to any disclaimer, the term of this patent is extended or adjusted under 35 U.S.C. 154(b) by 263 days.

(21) Appl. No.: 14/333,889

(22) Filed: Jul. 17, 2014

(65) Prior Publication Data
US 2016/0019065 A1    Jan. 21, 2016

(51) Int. Cl.
*G06F 9/38*     (2006.01)
*G06F 12/0862*  (2016.01)
*G06F 12/08*    (2016.01)

(52) U.S. Cl.
CPC ........... *G06F 9/3816* (2013.01); *G06F 9/3802* (2013.01); *G06F 12/0862* (2013.01)

(58) Field of Classification Search
CPC ............................ G06F 12/0862; G06F 9/3802
See application file for complete search history.

(56) References Cited

U.S. PATENT DOCUMENTS

| | | | | |
|---|---|---|---|---|
| 5,719,800 A * | 2/1998 | Mittal | .................. | G06F 1/32 713/321 |
| 6,678,795 B1 * | 1/2004 | Moreno | ............. | G06F 12/0862 711/137 |
| 7,337,278 B2 * | 2/2008 | Franaszek | ........... | G06F 12/0862 711/122 |
| 2005/0172079 A1 * | 8/2005 | McFarling | .......... | G06F 12/0802 711/133 |
| 2009/0300337 A1 * | 12/2009 | Wang | .................. | G06F 9/30145 712/225 |
| 2011/0320762 A1 * | 12/2011 | Soares | ................ | G06F 12/0862 711/207 |
| 2012/0166733 A1 * | 6/2012 | Cherukuri | ........... | G06F 12/0862 711/137 |

OTHER PUBLICATIONS

Mahapatra et al, The Processor-Memory bottleneck: Problems and Solutions, 1999, ACM, vol. 5 Issue 3, 10 pages.*
Hennessy and Patterson, Computer Architecture a Quantitative Approach, 2007, Morgan Kaufmann, Fourth edition, 60 pages.*

(Continued)

*Primary Examiner* — Andrew Caldwell
*Assistant Examiner* — Jyoti Mehta
(74) *Attorney, Agent, or Firm* — Nixon & Vanderhye P.C.

(57) ABSTRACT

A data processing apparatus has prefetch circuitry for prefetching cache lines of instructions into an instruction cache. A prefetch lookup table is provided for storing prefetch entries, with each entry corresponding to a region of a memory address space and identifying at least one block of one or more cache lines within the corresponding region from which processing circuitry accessed an instruction on a previous occasion. When the processing circuitry executes an instruction from a new region, the prefetch circuitry looks up the table, and if it stores a prefetch entry for the new region, then the at least one block identified by the corresponding entry is prefetched into the cache.

20 Claims, 5 Drawing Sheets

(56) References Cited

OTHER PUBLICATIONS

Kolli, A. et al., "RDIP: return-address-stack directed instruction prefetching", (2013), In the Proceedings of the 46th Annual IEEE/ACM International Symposium on Microarchitecture (MICRO-46), DOI=10.1145/2540708.2540731, http://doi.acm.org/10.1145/2540708.2540731, pp. 260-271.
Ferdman, M. et al., "Temporal instruction fetch streaming. In Proceedings of the 41st annual IEEE/ACM International Symposium on Microarchitecture (MICRO 41)" IEEE Computer Society, Washington, DC, USA, DOI=10.1109/MICRO.2008.4771774 http://dx.doi.org/10.1109/MICRO.2008.4771774, (2008), pp. 1-10.
Ferdman, M. et al. "Proactive instruction fetch", In Proceedings of the 44th Annual IEEE/ACM International Symposium on Microarchitecture (MICRO-44 '11), ACM, New York, NY, USA, DOI=10.1145/2155620.21556, 38 http://doi.acm.org/10.1145/2155620.2155638, (2011), pp. 1-11.
Ramirez, A. et al, "Fetching instruction streams", In Proceedings of the 35th annual ACM/IEEE international symposium on Microarchitecture (MICRO 35), IEEE Computer Society Press, Los Alamitos, CA, USA, (2002), pp. 1-12.
Chen, I-C, et al. "Instruction prefetching using branch predition information", Int. Conf. Computer Design 97, (Oct. 1997), 10 pages.
Reinman, G. et al., "Fetch directed instruction prefetching", InProceedings of the 32nd annual ACM/IEEE international symposium on Microarchitecture (MICRO 32), IEEE Computer Society, Washington, DC, USA, (1999), pp. 1-12.

\* cited by examiner

PREFETCHING USING A PREFETCH LOOKUP TABLE IDENTIFYING PREVIOUSLY ACCESSED CACHE LINES

BACKGROUND

The present technique relates to the field of data processing. More particularly, it relates to prefetching of instructions to a cache in a data processing apparatus.

A data processing apparatus may have an instruction cache for storing instructions. When an instruction needs to be executed by processing circuitry, it is fetched from the cache. If an instruction to be executed is not in the cache, then it is fetched from memory, but this may delay processing. To improve performance, a prefetcher may be provided to prefetch instructions into the cache before they are actually needed by the processing circuitry. To predict which instructions are likely to be executed in the future by the processing circuitry, most known prefetchers require a reasonably large amount of tracking data generated based on past instruction accesses. The present technique seeks to provide a more efficient prefetching technique.

SUMMARY

Viewed from one aspect, the present technique provides a data processing apparatus comprising:

prefetch circuitry configured to prefetch cache lines comprising one or more instructions from a memory to store the prefetched cache lines in an instruction cache; and a prefetch lookup table configured to store a plurality of prefetch entries, each prefetch entry corresponding to a region of a memory address space and identifying at least one block of one or more cache lines within the region from which an instruction was accessed in the instruction cache by processing circuitry on a previous occasion; wherein:

in response to the processing circuitry executing an instruction from a new region of the memory address space, the prefetch circuitry is configured to perform a prefetch lookup operation comprising determining whether the prefetch lookup table stores a target prefetch entry corresponding to the new region, and if the prefetch lookup table stores the target prefetch entry, prefetching said at least one block identified by the target prefetch entry.

The inventors of the present technique realised that access patterns of instructions accessed by the processing circuitry in the cache tend to be regional, which can be exploited to make prefetch circuitry more efficient. A prefetch lookup table is provided which stores prefetch entries which each correspond to a given region of the memory address space and identify at least one block of one or more cache lines within the corresponding region from which an instruction was accessed in the cache by the processing circuitry on a previous occasion. When the processing circuitry executes an instruction from a new region of the memory address space, the prefetch circuitry looks up to the table and if the table includes a target prefetch entry for the new region of the address space, then the prefetch circuitry prefetches the at least one block of cache lines that is indicated by the target prefetch entry as having been accessed before. Hence, if the processing circuitry previously executed instructions from a given set of blocks in a particular region, on returning to that region it can be expected that the processing circuitry is likely to execute similar instructions again and so these blocks of cache lines can be prefetched into the cache.

This approach is useful for reducing the overhead of the prefetch circuitry for several reasons. Firstly, the prefetching need only take place when the processing circuitry moves to an instruction in a new region of the memory address space, reducing the overhead of the prefetch circuitry. Also, by grouping the tracking data in the lookup table into entries corresponding to each region, this can reduce the amount of stored data required for tracking accesses to a given range of the address space while still maintaining similar performance to previous techniques.

In some examples, the processing circuitry may be detected as executing an instruction from a new region of the memory address space if, after executing an instruction from one region of the memory address space, it then executes an instruction from a different region of the memory address space.

In some examples, the prefetch entry corresponding to a given region of the address space may identify all blocks within that region which contain instructions which were accessed by the processing circuitry on a previous occasion. However, this may require the prefetch circuitry to prefetch a large amount of data into the cache at the point when the processing circuitry moves to a new region.

A more efficient approach may be to provide the prefetch circuitry with next line prefetch circuitry which prefetches the next cache line which follows the cache line including an instruction currently being executed by the processing circuitry and stores the next cache line in the instruction cache. Hence, as the processing circuitry moves from cache line to cache line, the next line prefetch circuitry may stay a step ahead and prefetch the next cache line into the cache in anticipation that the processing circuitry may move to that cache line next. The prefetch entries in the prefetch lookup table may then identify only the non-contiguous blocks from which instructions were accessed before. For example, the non-contiguous blocks may correspond to the targets of branches that were taken by the processing circuitry while executing instructions from that region. This approach can be more efficient since the next line prefetch circuitry may be implemented using relatively small and efficient circuitry, while indicating only the non-contiguous blocks in the prefetch lookup table reduces both the storage overhead of the table and the prefetching overhead when the processing circuitry switches from one region to another.

In general, the regions for which prefetch entries are defined may be any sub-division of the address space. For example, the regions may correspond to pages of the memory space. Each region may include a number of cache lines. The cache line may be a unit of data corresponding to the minimum amount of data which is transferred to the cache at a time. For example, each cache line may include one or more instructions. The prefetch entry may include a number of indicator bits with each indicator bit corresponding to a block of one or more cache lines within the corresponding region and indicating whether the corresponding block was accessed by the processing circuitry a previous time the processing circuitry executed instructions from that region. In some cases, each indicator bit may correspond to only one cache line, so that if an instruction from that cache line was executed before by the processing circuitry, then on returning to the same region that cache line will be prefetched.

To reduce the amount of storage required for the prefetch lookup table it is also possible for each block to comprise multiple cache lines, with an indicator bit in the prefetch entry indicating whether any of the cache lines within the corresponding block were accessed on the previous visit to the corresponding region. Hence, if a particular cache line was accessed previously, on returning to the region the block including that cache line may be prefetched, including other cache lines within the same block even if those cache lines were not actually accessed by the processing circuitry. Hence, the number of cache lines per block can be selected to trade off the amount of storage occupied by the prefetch lookup table against the amount of data that will be prefetched when the processor changes region. Nevertheless, regardless of the block size the prefetch lookup table can be relatively small since each entry may comprise a single bit per block of cache lines within the region.

Prefetch entries may be loaded into the prefetch lookup table as the processor moves from region to region. It is not necessary for the prefetch lookup table to include prefetch entries for all regions of the memory address space. When a new region is encountered which does not already have an entry in the previous lookup table, if there is no more space for a new prefetch entry then an older prefetch entry can be evicted from the table. Therefore, it is not necessary to track accesses to instructions across the entire address space using the table. This helps to reduce the amount of tracking data that is to be stored.

The prefetch lookup table can be implemented with different structures. For example, the look up table may be a simple table or direct mapped cache in which each region has a corresponding location within the table for storing its prefetch entry, and the region's entry cannot be stored in other locations of the table. Alternatively, the prefetch lookup table may have a set-associative or fully-associative cache structure where an entry for a given region can be stored in one of a set of locations (set-associative) or in any location within the table (fully-associative). In each case, the table may include a tag portion representing at least part of an identifier of the corresponding region and a data portion including the indication of which blocks were accessed when the region was previously accessed are returned by the table.

It is possible for the prefetch circuitry to continually update the prefetch lookup table to indicate which blocks have been accessed, as the processor accesses instructions in the cache. However, a more efficient approach can be to provide a training table for tracking accesses to the instruction cache by the processing circuitry, and to update the prefetch lookup table based on the training table. The training table may typically be smaller than the prefetch lookup table as it need only contain entries for one region, or relatively few regions, of the address space and so accessing the training table to update which blocks have been accessed by the processor can be more energy efficient than accessing the larger prefetch lookup table. The update to the prefetch lookup table may take place less frequently and may correspond to copying data from the training table to the prefetch lookup table. This approach can reduce the amount of table searching required, to reduce energy consumption.

For example, the training table may store at least one training entry for a corresponding region, and the prefetch circuitry may update the corresponding training entry to indicate which blocks of cache lines have been accessed by the processing circuitry. In one example, the training table may include only one training entry so that the prefetch circuitry tracks which blocks are accessed while the processor stays within the same region. When the processor moves onto a different region, the prefetch circuitry may then copy data from the training table into the prefetch lookup table and then clear the training entry and start tracking accesses by the processor for the new page using the same training entry. As it may be expected that the processor will tend to remain within the same region for a time before moving to a different region, this approach may often be sufficient.

On the other hand, sometimes the processing circuitry may execute instructions from one region of the address space, then switch to another region and execute some instructions before jumping back to the first region. With a single training entry, references to the first region may not be tracked across the jump to the second region, so that on a subsequent visit to the first region not all of the blocks accessed by the processing circuitry on the previous visits may be fetched. To improve the predictive ability of the prefetcher, additional prefetch targets may be tracked across region jumps. For example, the training table may be provided with multiple training entries which track instruction accesses from a number of recently accessed regions.

As mentioned above, a next line prefetcher may be implemented and so the prefetch lookup table need only track non-contiguous blocks which were accessed by the processor. Similarly, the prefetch circuitry may update the training table only with non-contiguous accesses. Hence, if the processor is executing an instruction from one block and then moves to an instruction from the following block, this does not need to be tracked in the training table. The training table can be updated only if the block including the cache line accessed by the processor is not adjacent to the previous block accessed by the processor.

The update to the prefetch lookup table based on the training table may occur at any arbitrary timing. For example, the prefetch circuitry may periodically update the prefetch lookup table based on the training table.

However, it can be useful to trigger the prefetch lookup table update in response to the processing circuitry switching to a new region of the address space. In particular, the update may be done if the processing circuitry moves to a new region of the address space for which the training table does not already store a training entry. At this point, a new training entry may be required in the training table for the new region, and if there is not enough space in the training table for the new entry then an older training table entry may be evicted and the data within that entry written to the prefetch lookup table. Hence, the training table may record accesses to the last N pages and the training entries may be replaced in a first in first out (FIFO) order (or another order) and written back to the prefetch lookup table.

When updating the prefetch lookup table based on a training entry, one approach may be simply to write the training entry directly to the table. However, if the prefetch lookup table already includes a previous prefetch entry corresponding to the same region as the training entry, then this may overwrite previous prefetch target information stored in the prefetch lookup table. In practice, this may be enough to gain a significant performance benefit, as the likelihood of the instructions accessed in a given region changing between visits to the region may be reasonably low, so it may be acceptable to overwrite previous prefetch entries in order to simplify the updating of the table.

On the other hand, if it is desired to retain some of the information from the previous prefetch entry, the prefetch lookup table may be updated to include an updated prefetch entry which is a function of the previous prefetch entry and the training entry for the corresponding region. For example, the previous and training entries may be ORed to combine the previous and new prefetch targets, or a set difference could be provide to move old and not-reseen targets so that over time the training entries would reduce the number of candidate lines. This approach allows a further performance improvement by retaining information on prefetch candidates in the prefetch lookup table across multiple visits to a region even if not all the prefetch candidates are accessed on a particular visit.

Looking up the prefetch lookup table and then prefetching any blocks of cache lines indicated in the corresponding prefetch entry incurs an energy overhead which may not always be justified. Therefore, in some examples the prefetch circuitry may determine whether a prefetch criterion is satisfied when the processing circuitry moves to a new region, and then perform the prefetch lookup (and any subsequent prefetching) if the prefetch criterion is satisfied. For example, there may be certain regions of the address space for which the benefit from prefetching is expected to be small. For example, there may be some code for which access patterns are very unpredictable, or for which energy saving is a more important consideration than the performance improvement which can be achieved by prefetching. Therefore, prefetching could be disabled for such regions, to reduce the energy consumed by avoiding looking up the table and accessing the memory. For example, the prefetch circuitry may have region defining data indicating for which regions the table lookup should be performed. Similarly the training table population may be disabled for regions for which no prefetching is carried out. The next line prefetching may still be carried out regardless of whether the prefetch criterion is satisfied.

Also, if a new region encountered by the processing circuitry has been accessed recently, then it is likely that the instructions executed for that region are still in the instruction cache since it is unlikely that enough intervening instructions have been executed to evict instructions for that region. Therefore, it may be more efficient to supress the table lookup and prefetching (other than next line prefetching). Therefore, the prefetch criterion may be whether the new region is one of the N most recently accessed regions of the address space, where N can be any number equal to or greater than one. While it is possible to provide separate tracking data for tracking the most recently accessed regions of the address space, in practice the training table may already do this since it may have one or more training entries which may correspond to the most recently accessed regions. Therefore, one way of preventing prefetching of instructions from recently accessed regions may be to prevent prefetching if the new region accessed by the processing circuitry already has a training entry in the training table. Hence, the training table may serve multiple purposes, both filtering prefetches and tracking accesses by the processor for subsequent updates to the prefetch lookup table.

In some embodiments, each region of the address space may have a maximum of one prefetch entry in the prefetch lookup table.

However, the instructions executed by the processing circuitry after entering a particular region of the address space may depend on which instruction is the first instruction executed from that region. For example, branch instructions may branch to two different branch targets within the same region and then a completely different set of instructions may be executed depending on the entry point. Therefore, it can be useful to provide multiple prefetch entries for the same region of the address space corresponding to the different entry points. Hence, the prefetch circuitry may select the target prefetch entry used for prefetching based on which instruction is the first instruction to be executed by the processing circuitry from the new region. For example, the prefetch circuitry may perform a hash of the address of the new region and an address offset identifying a position of the first instruction executed from that region, to obtain an identifier of the target prefetch entry within the table. This allows different sets of prefetch targets to exist for the same region depending on the initial cache line fetch for that region.

In some cases, the data processing apparatus may include the instruction cache itself for storing instructions, and/or the processing circuitry for performing data processing in response to instructions accessed from the cache. However, in other cases the prefetch circuitry and prefetch lookup table may be implemented on a separate device or chip to the processing circuitry and/or the instruction cache.

Viewed from another aspect, the present technique provides a data processing apparatus comprising:

prefetching means for prefetching cache lines comprising one or more instructions from a memory, to store the prefetched cache lines in an instruction caching means; and prefetch lookup table means for storing a plurality of prefetch entries, each prefetch entry corresponding to a region of a memory address space and identifying at least one block of one or more cache lines within the region from which an instruction was accessed in the instruction caching means by processing means on a previous occasion; wherein:

in response to the processing means executing an instruction from a new region of the memory address space, the prefetching means is configured to perform a prefetch lookup operation comprising determining whether the prefetch lookup table means stores a target prefetch entry corresponding to the new region, and if the prefetch lookup table means stores the target prefetch entry, prefetching said at least one block identified by the target prefetch entry.

Viewed from a further aspect, the present technique provides an instruction prefetching method for a data processing apparatus comprising a prefetch lookup table configured to store a plurality of prefetch entries, each prefetch entry corresponding to a region of a memory address space and identifying at least one block of one or more cache lines within the region from which an instruction was accessed in the instruction cache by processing circuitry on a previous occasion;

the method comprising:

in response to the processing circuitry executing an instruction from a new region of the memory address space, determining whether the prefetch lookup table stores a target prefetch entry corresponding to the new region; and if the prefetch lookup table stores the target prefetch entry, prefetching said at least one block identified by the target prefetch entry.

Further aspects, features and advantages of the present technique will be apparent from the following detailed description which is to be read in conjunction with the accompanying drawings.

DESCRIPTION OF EXAMPLE EMBODIMENTS

Figure 1:
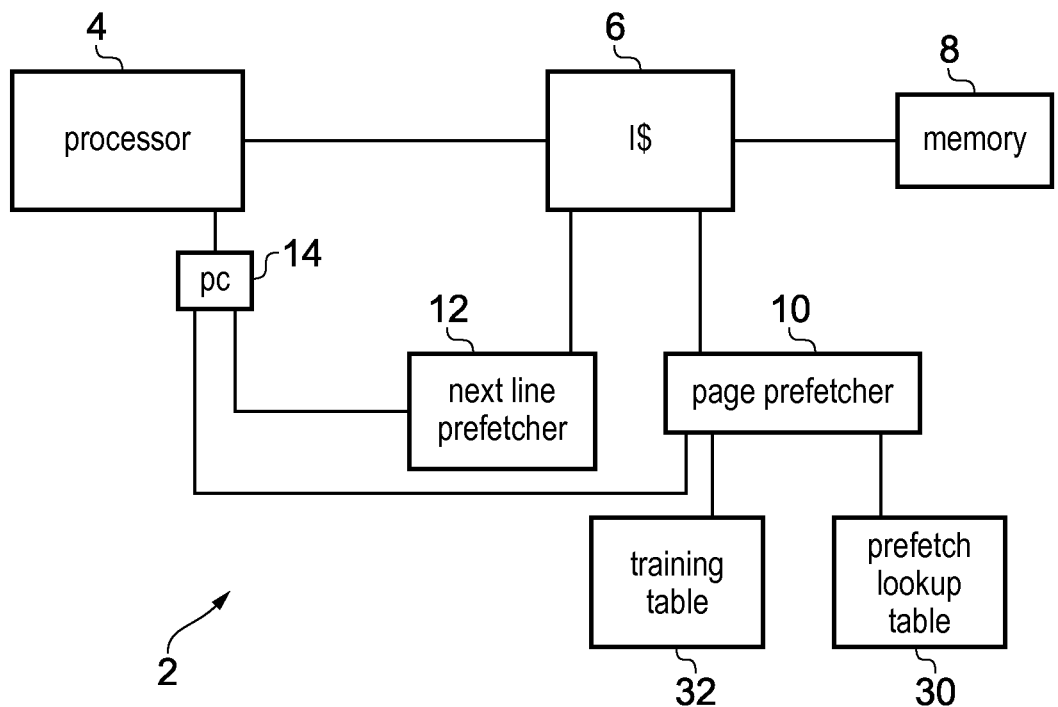
FIG. 1 schematically illustrates a data processing apparatus having prefetch circuitry for prefetching instructions into an instruction cache.

FIG. 1 schematically illustrates a data processing apparatus 2 having a processor 4 for processing instructions, an instruction cache 6 for storing instructions to be executed by the processor 4, and a memory 8. Although not illustrated, in some systems there may be multiple levels of cache between the processor 4 and the memory 8. Instructions can be fetched from memory 8 into the instruction cache 6 when required for execution by the processor 4. However, fetching the instructions from memory causes a delay and so if the instructions are fetched only when needed by the processor 4 then this can reduce processing performance. To improve performance, prefetch circuitry including a page-based prefetcher (or "page prefetcher") 10 and a next line prefetcher 12 is provided for prefetching instructions from memory 8 into the cache before they are needed by the processor 4. The prefetch circuitry makes a prediction of which instructions are expected to be needed by the processor 4, and prefetches the predicted instructions. Even if there is an occasional miss in the instruction cache 6 when a required instruction is not available, the prefetching can significantly improve performance.

Figure 2:
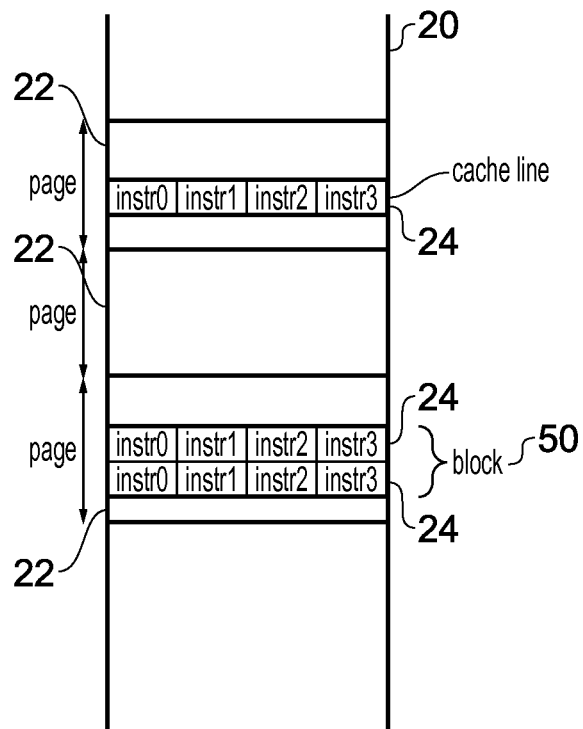
FIG. 2 shows an example of the memory address space divided into pages with each page including blocks of one or more cache finds.

FIG. 2 shows an example of a memory address space 20 which is subdivided into regions called "code pages" or "pages" 22. The pages 22 may be of any desired size such 4 KB for example. If the system uses virtual addressing, then the code pages may in some examples correspond to the page size used by a TLB for virtual-to-physical address translation, or may correspond to another arbitrary size. Each code page 22 includes a number of cache lines 24 which contain a number of instructions. The cache line represents the unit of data which is fetched into the cache 6 in one go, either being fetched on demand when there is a miss in the instruction cache 6 for a required instruction, or prefetched ahead of time by the prefetch circuitry 10, 12. A single cache line may include several instructions. For example, a cache line 24 may include 64 bytes representing a number of instructions depending on the length of the instruction encoding.

The next line prefetcher 12 monitors a program counter 14 which indicates the instruction to be executed by the processor 4. As the processor executes instructions from one cache line in the memory address space, the next line prefetcher 12 prefetches the following cache line and stores the prefetched cache line to the instruction cache 6. Since program execution is generally sequential other than occasional branches, this approach can provide relatively efficient prefetching.

However, when there is a branch or other non-sequential program flow, the next line prefetcher 12 may not fetch the right cache line and so there may be a miss in the instruction cache 6. The page-based prefetcher 10 predicts non-sequential jumps and prefetches cache lines corresponding to predicted jump targets into the cache 6 before the processor 4 reaches the non-sequential program flow. The page prefetcher 10 has a prefetch lookup table 30 which it uses to predict which cache lines should be prefetched and a training table 32 for tracking the accesses made by the processor 4 and updating the prefetch lookup table 30 based on those accesses. To track the accesses made by the processor 4, the page based prefetcher 10 also has access to the program counter 14.

Figure 3:
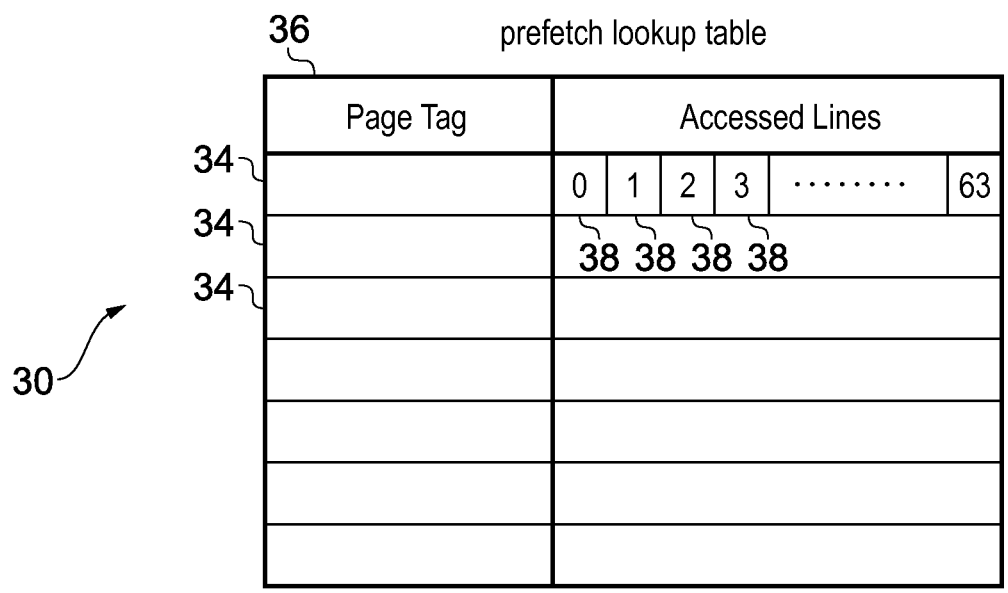
FIG. 3 shows an example of a prefetch lookup table.

FIG. 3 shows an example of the prefetch lookup table 30, which includes a number of prefetch entries 34 each corresponding to a corresponding page 22 of the address space. Each entry includes a page tag 36 which identifies the corresponding page 22 and set of bit indicators 38 indicating which cache lines were accessed from the corresponding page a previous time that the processor 4 was executing instructions from that page. In this example each cache line 24 within the corresponding page 22 has a corresponding bit indicator 38 which is set to 1 if that cache line should be prefetched on the next visit to the corresponding page 22, and is set to 0 if the cache line should not be prefetched. In this example the table 30 is implemented using a direct-mapped cache structure in which each page 22 has its entry stored to a corresponding location in the table indexed based on the page address (the page address may correspond to the leading N bits of the addresses of instructions within that page, with N depending on the page size). If the location corresponding to a particular page is already taken when that page needs an entry in the table, then the existing entry in that location can be evicted to make way for the entry for a new page. The page tag 36 may store the part of the page address which is not used for indexing into the table. In other examples, the table could have a set-associative or fully-associative structure where there is freedom to store an entry for the table in multiple locations within the table.

The prefetch lookup table exploits the fact that when the processor 4 enters a new page, generally there are multiple nearby addresses within the same page corresponding to functions or nearby code which may regularly be accessed around the same time. By tracking these accesses within the same page, this can give a good prediction of which cache line should be prefetched the next time the processor 4 starts executing instructions from the same page. The prefetch lookup table 30 helps to track which cache lines are candidates for prefetching when a new code page is accessed. Hence, when the page prefetcher 10 determines from the program counter 14 that the processor 4 is now executing instructions from a different page to the page associated with the previous instruction, then the page prefetcher 10 may look up the prefetch lookup table 30, check whether the table includes a corresponding entry 34 for the new page, and if so, then prefetch the cache lines which are indicated by the bit indicators 38 set to 1. This approach is more efficient than previous techniques because the prefetch lookup table 30 only needs to be accessed on page transitions rather than being continually looked up as the processor executes instructions, and the indication of accessed lines comprises a simple set of bit indicators, comprising one bit per cache line in this example.

Figure 4:
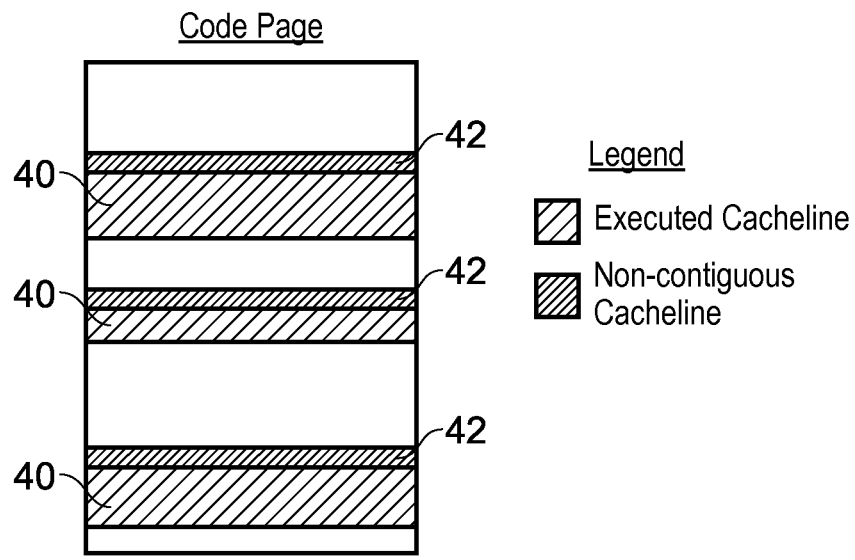
FIG. 4 shows an example of non-contiguous blocks of cache lines within the same page.

It is possible for the prefetch lookup table 30 to track all the cache lines which were accessed by the processor 4 the previous time that the processor executed from that page. However, this can lead to a relatively large amount of data being prefetched on page transitions. Since the next line prefetcher 10 already may prefetch the next cache line following the currently cache line being executed by the processor 4, then the prefetch lookup table 30 only needs to track the non-contiguous sets of cache lines within the page 22 that were executed on that visit to this page. As shown in FIG. 4, there may be a number of cache lines 40 which were executed on the previous visit to the page but the prefetch lookup table 30 only needs to track the non-contiguous cache lines 42 which mark the start of each series of contiguous cache lines 40. Hence, in this example the prefetch entry for this page would only mark 3 cache lines as needing to be prefetched, rather than all the access cache lines 40 that were accessed. This reduces the overhead of the page prefetcher.

Figure 5:
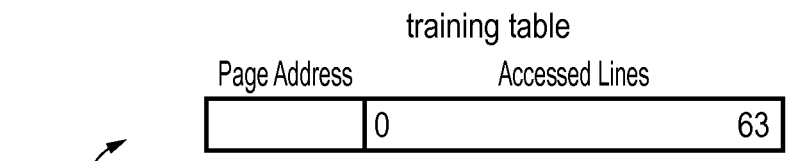
FIG. 5 shows an example of a training table for tracking accesses by the processor to cache lines.

FIG. 5 shows an example of the training table 32. In the simplest implementation, the training table 32 may include a single training entry which has the same structure as the same prefetch entries of the prefetch lookup table 30. As the processor 4 executes the instructions, the prefetcher 10 updates the training entry to mark the cache lines that were accessed by the processor 4. Again, only the non-contiguously accessed cache lines need to be marked. When execution proceeds to a different code page 22, the training entry from the training table 32 may be written back to the prefetch lookup table 30, which operates as a small cache for this access information. If there are no free locations in the prefetch lookup table 30 available for storing an entry for a given page (depending on the associativity of the table 30), then an older entry may need to be evicted. The prefetcher 10 may then clear the training entry in the training table 32 and start tracking accesses to the new page by the processor 4 using the training entry. Hence, the processor 4 moving to a new page may trigger both prefetching into the cache 6 based on an entry of the prefetch lookup table 30 and updating of the prefetch lookup table 30 based on the training table 32.

Figure 6:
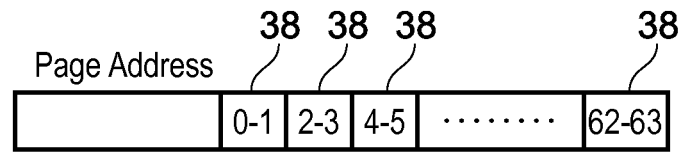
FIG. 6 shows an example in which an entry of the prefetch lookup table tracks previous accesses to blocks of multiple cache lines.

As shown in FIG. 6, rather than indicating the access status of each cache line within the prefetch entry 34, it is possible for the prefetch entry to have bit indicators 38 corresponding to blocks of two or more cache lines from the same page. For example, in FIG. 6 each bit indicator 38 corresponds to a block 50 of two adjacent cache lines as shown in FIG. 2. This allows the size of the prefetch lookup table to be reduced by reducing the number of bit indicators 38. Hence, adjacent even and odd cache lines are represented by the same bit so there is a denser encoding, with prefetching at a coarser granularity. When a new page is entered by the processor 4, the two cache lines at each target bit marked by an indicator bit of 1 will be prefetched, even if only one of these lines was accessed before.

By varying the size of the blocks 50 from 1, 2 or more cache lines, a trade-off can be selected between performance and the storage capacity required for the prefetch lookup table 30. For example, with the implementation shown in FIG. 3, to map a 1 MB region the lookup data section is 2 KB in size. With 16-bit tags (allowing some inaccuracy), the tags are only 0.5 KB. This space requirement can be reduced further using the approach shown in FIG. 6. For example, in FIG. 6 only 32 bits are required to represent blocks of adjacent even and odd cache lines, so that the data storage is reduced to 1 KB for mapping a 1 MB region of memory.

Figure 7:
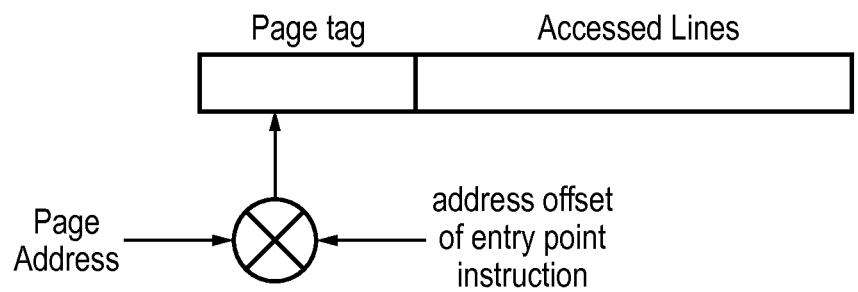
FIG. 7 shows an example where the prefetch entry is selected based on the page address of the accessed page and the first instruction executed within that page.

It is possible to provide the prefetch lookup table 30 with multiple entries 34 for the same page 22. For example, a different set of prefetch targets may be desired depending on whether the processor 4 enters the page 22 at a first entry point or a second entry point. Therefore, additional hashing of the page address can be done. For example, as shown in FIG. 7, the page address may be hashed with an address offset representing the instruction, cache line 24 or block 50 at which the processor 4 enter the page, to generate the page identifier for indexing into the prefetch lookup table 30 and comparing against the page tag 36. This allows multiple different sets of prefetch targets for a page to exist in the table depending on the initial cache line executed from that page. Any desired function may be used as the hashing function.

Figure 8:
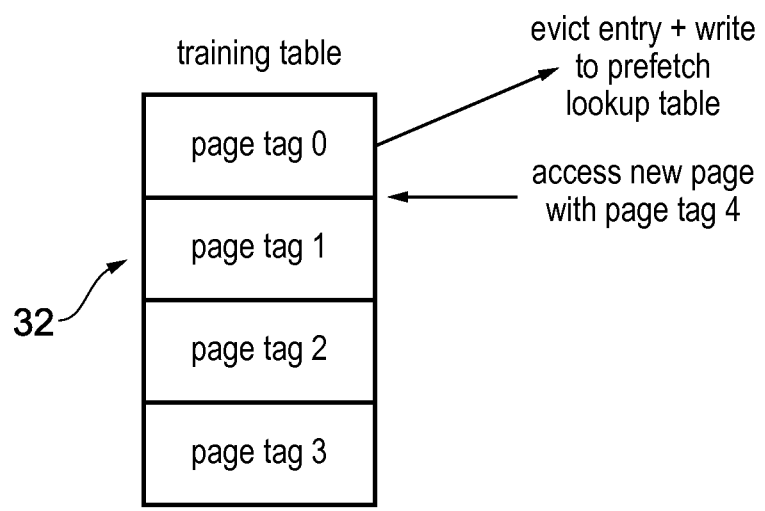
FIG. 8 shows an example of a training table having multiple training entries.

FIG. 8 shows an example in which the training table 32 is extended to have multiple training entries. These entries may record the accesses made by the processor 4 to cache lines on the last N pages that were accessed. For example, FIG. 8 shows an example with four training entries. This allows the prefetcher to record additional targets across page jumps. When the processor 4 accesses a new page which does not already have an entry in the training table 32, a new training entry is set up and if the training table 32 is already full then an older training entry is evicted and the prefetch lookup table 30 is updated based on this evicted entry. For example, the training entries is may be replaced in age order so that the training table and fetch reacts as FIFO buffer.

On updating the prefetch lookup table based on a training entry, a simple approach may be to simply write the evicted training entry to a page entry 34 of the prefetch lookup table 30. If there is already a prefetch entry 34 for the same page, then this can be overwritten by the training entry to update the prefetch targets. On the other hand, if it is desired to retain some of the existing information in the prefetch lookup table, the new prefetch entry 34 in the lookup table 30 may be set as a function of the corresponding training entry and the old prefetch entry which was in the table 30. For example, the training entry and previous entry may be combined using an OR gate so that the updated entries are now indicated as access lines any cache lines indicated in either the training entry or the previous entry. Alternatively a more complicated function may be used to phase out older prefetch targets in favour of newer ones.

The prefetcher of the present technique is relatively energy efficient because it is only accessed for lookups when there is a page transition in the instructions being executed by the processor 4. However, for further efficiency unnecessary prefetches or page changes could be filtered for example based on the page identifier of the new page accessed. If a new code page has previously been executed within the last N pages (where N is a relatively small integer), it is likely that its access cached lines are still present in the cache. In this case, no lookup needs to generated and no prefetches (other than the next line prefetches by the next line prefetcher 12) need to be carried out. As shown in FIG. 8, multiple training entries can be maintained in the training table 32 for the last N pages, and so the training entries can be multi-purpose to serve this filtering function. Hence, on accessing a new page, if the new page already has a training entry in the training table 32, then the prefetch lookup does not need to be performed.

Figure 9:
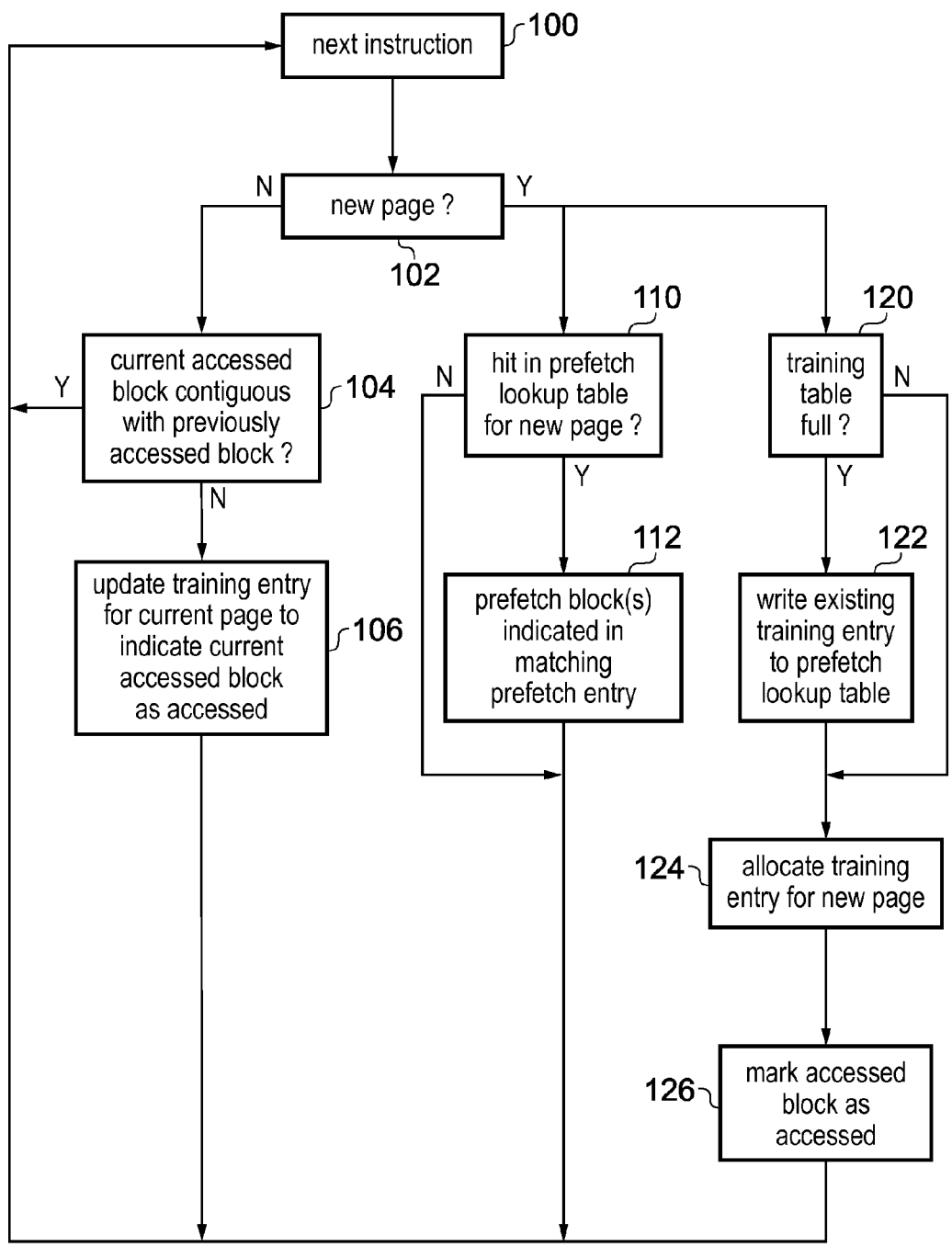
FIG. 9 illustrates a method of prefetching instructions.

FIG. 9 shows a method of page-based prefetching of instructions into an instruction cache. At step 100 the processor 4 accesses the next instruction from the cache. At step 102 the page prefetcher 10 determines whether the processor 4 has moved to a new page 22 of the address space. For example, the processor 4 may be determined to have moved to a new page if the page comprising the next instruction does not already have a training entry in the training table 32. If the processor has not moved to a new page, then at step 104 the page prefetcher 10 determines whether the block 50 of one or more cache lines 24 currently accessed by the processor 4 is contiguous with the previously accessed block 50 (this will be the case if the instructions are from the same block or from neighbouring blocks). If so, then no update to the training table 32 is performed and the method returns to step 100. On the other hand, if the processor 4 has moved to a new block 50 of cache lines which is non-contiguous with a previously accessed block but within the same page 22, then at step 106 the page prefetcher 10 updates the training table 32 so that the training entry for the currently accessed page 22 indicates that the currently accessed block of cache lines has been accessed by the processor 4. Then the method returns to the step 100 for the next instruction.

If the page prefetcher 10 detects that the processor 4 has moved to an instruction on a new page 22, then at step 110 the page prefetcher 10 looks up the prefetch lookup table 30 and determines whether it includes a corresponding prefetch entry 34 for the new page. If there is a hit in the prefetch lookup table then at step 112 the page prefetcher 10 prefetches any blocks of cache lines indicated in the matching prefetch entry 34 for the new page as being prefetch targets. The prefetched cache lines are stored in the instruction cache 6. On the other hand, if the lookup misses in the prefetch lookup table 30, then step 112 is omitted.

In parallel with the prefetch lookup, at step 120 the prefetcher 10 determines whether the training table 32 is full. If so, at step 122 an existing training entry from the training table is evicted and written to the prefetch lookup table 30. On writing to the prefetch lookup table, if there is no existing prefetch entry 34 for the same page then the training entry is simply stored in the table (with an eviction from the table 30 if there are no locations available for storing the entry for this page). If there is an existing prefetch entry 34 in the prefetch lookup table 30 for the same page, then this can be overwritten with a training entry or the training entry and the existing prefetch entry can be merged to form an updated prefetch entry. At step 124, a new training entry is allocated in the training table 32 for the new page. At step 126, the block of cache lines including the instruction accessed in the cache 6 by the processor 4 is now marked as having been accessed. The method now returns to step 100.

Meanwhile, throughout the method shown in FIG. 9, the next line prefetcher 12 continues to monitor the cache lines accessed by the processor 4 and fetch the next cache line that follows the cache line accessed by the processor.

In this way, the prefetch circuitry can achieve performance improvement with less storage overhead and energy consumption than in previous implementations.

Figure 10:
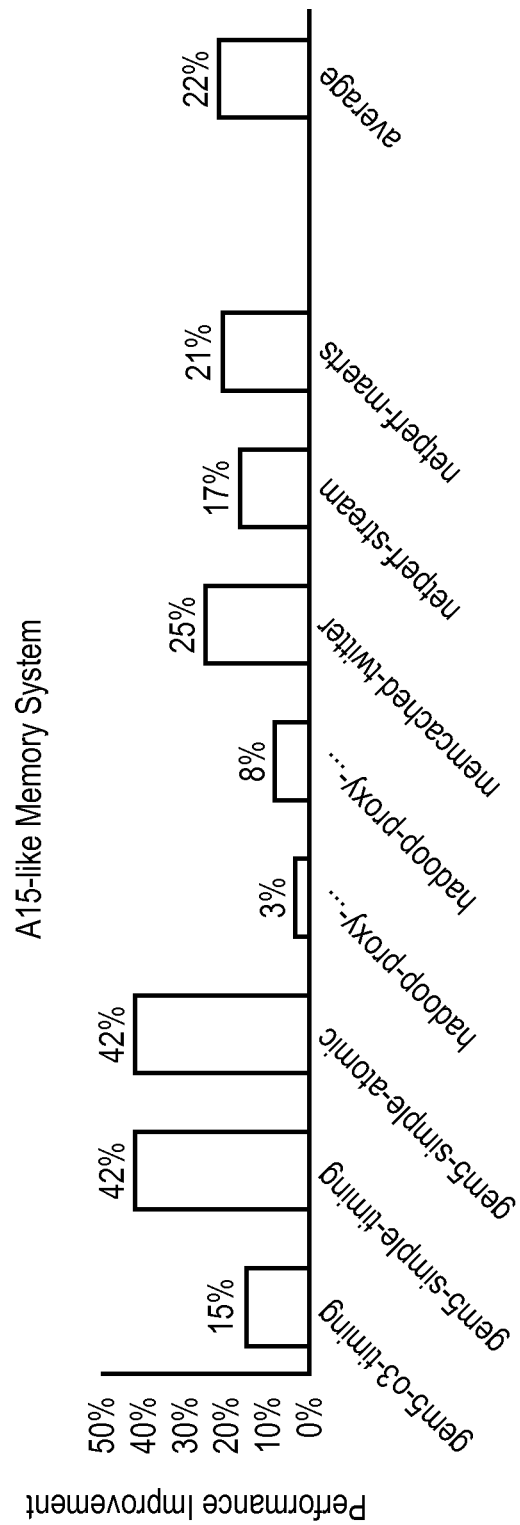
FIG. 10 is a graph showing simulated performance improvement compared to an apparatus which only uses next line prefetching.

The technique shown above was implemented within the gem5 simulation environment and run on multiple benchmarks known to have bad instruction cache access hit rates. FIG. 10 shows the performance improvement when the page-based prefetcher 10 is used in conjunction with a next line prefetcher 12, compared to a machine solely equipped with the next line prefetcher 12. The prefetcher configuration required 1 KB of storage and on average a 22% gain in performance was observed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
prefetch circuitry configured to prefetch cache lines comprising one or more instructions from a memory to store the prefetched cache lines in an instruction cache; and
a prefetch lookup table configured to store a plurality of prefetch entries, each prefetch entry corresponding to a region of a memory address space and identifying at least one block of one or more cache lines within the region from which an instruction was accessed in the instruction cache by processing circuitry on a previous occasion; wherein:
the prefetch circuitry is configured to detect, based on a program counter, whether an instruction to be executed by the processing circuitry is from a new region of the memory address space; and
in response to detecting based on said program counter that said instruction to be executed is from said new region of the memory address space, the prefetch circuitry is configured to perform a prefetch lookup operation comprising determining whether the prefetch lookup table stores a target prefetch entry corresponding to the new region, and in response to determining that the prefetch lookup table stores the target prefetch entry, prefetching said at least one block identified by the target prefetch entry.

2. The data processing apparatus according to claim 1, wherein the prefetch circuitry comprises next line prefetch circuitry configured to prefetch a next cache line following a cache line comprising an instruction currently being executed by the processing circuitry, and to store the next cache line in the instruction cache.

3. The data processing apparatus according to claim 2, wherein each prefetch entry identifies one or more non-contiguous blocks within the corresponding region from which an instruction was accessed in the instruction cache by the processing circuitry on a previous occasion.

4. The data processing apparatus according to claim 1, wherein each prefetch entry comprises a plurality of indicator bits, wherein each indicator bit corresponds to a corresponding block of one or more cache lines within the corresponding region and indicates whether the corresponding block is one of said at least one block.

5. The data processing apparatus according to claim 1, comprising a training table for tracking accesses to the instruction cache by the processing circuitry;
wherein the prefetch circuitry is configured to update the prefetch lookup table based on the training table.

6. The data processing apparatus according to claim 5, wherein the training table is configured to store at least one training entry for a corresponding region of the memory address space; and
in response to the processing circuitry accessing an instruction from a selected cache line in the instruction cache, the prefetch circuitry is configured to update a corresponding training entry for a region including the selected cache line to indicate that a block of one or more cache lines including the selected cache line is a selected block from which the processing circuitry accessed an instruction.

7. The data processing apparatus according to claim 6, wherein the training table is configured to store a plurality of training entries.

8. The data processing apparatus according to claim 6, wherein in response to the processing circuitry accessing the instruction from the selected cache line, the prefetch circuitry is configured to update the corresponding training entry only in response to determining that the block including the selected cache line is non-contiguous with a previous block of one or more cache lines from which an instruction was accessed by the processing circuitry.

9. The data processing apparatus according to claim 6, wherein the prefetch circuitry is configured to update the prefetch lookup table to include an updated prefetch entry corresponding to a selected region based on a training entry of the training table corresponding to the selected region.

10. The data processing apparatus according to claim 9, wherein in response to the prefetch lookup table already including a previous prefetch entry corresponding to the selected region, the prefetch circuitry is configured to determine the updated prefetch entry as a function of the previous prefetch entry and the training entry.

11. The data processing apparatus according to claim 6, wherein in response to detecting that said instruction to be executed is from said new region of the memory address space for which the training table does not already store a training entry, the prefetch circuitry is configured to allocate a new training entry in the training table for said new region, and in response to determining that the training table does not have space for the new training entry, to update the prefetch lookup table based on an existing training entry of the training table.

12. The data processing apparatus according to claim 1, wherein in response to detecting that said instruction to be executed is from said new region of the memory address space, the prefetch circuitry is configured to determine whether a prefetch criterion is satisfied, and to perform the prefetch lookup operation only in response to determining that the prefetch criterion is satisfied.

13. The data processing apparatus according to claim 12, wherein the prefetch circuitry is configured to determine that the prefetch criterion is satisfied when the new region is not one of N most recently accessed regions of the memory address space, where N≥1.

14. The data processing apparatus according to claim 12, comprising a training table comprising at least one training entry, each training entry corresponding to a corresponding region of the memory address space and tracking accesses by the processing circuitry to instructions from the corresponding region;
wherein the prefetch circuitry is configured to determine that the prefetch criterion is satisfied when the new region does not already have a training entry in the training table.

15. The data processing apparatus according to claim 1, wherein the prefetch circuitry is configured to select the target prefetch entry corresponding to the new region in dependence on which instruction is a first instruction executed by the processing circuitry from the new region.

16. The data processing apparatus according to claim 15, wherein the prefetch circuitry is configured to select the target prefetch entry based on an address of the new region and an address offset identifying a position of said first instruction within the new region.

17. The data processing apparatus according to claim 15, wherein the prefetch lookup table is configured to store a plurality of prefetch entries corresponding to the same region of the memory address space and corresponding to different instructions executed as the first instruction executed by the processing circuitry from the new region.

18. The data processing apparatus according to claim 1, further comprising said processing circuitry.

19. A data processing apparatus comprising:
prefetching means for prefetching cache lines comprising one or more instructions from a memory, to store the prefetched cache lines in an instruction caching means; and
prefetch lookup table means for storing a plurality of prefetch entries, each prefetch entry corresponding to a region of a memory address space and identifying at least one block of one or more cache lines within the region from which an instruction was accessed in the instruction caching means by processing means on a previous occasion; wherein:
the prefetching means is configured to detect, based on a program counter, whether an instruction to be executed by the processing means is from a new region of the memory address space; and
in response to detecting based on said program counter that said instruction to be executed is from said new region of the memory address space, the prefetching means is configured to perform a prefetch lookup operation comprising determining whether the prefetch lookup table means stores a target prefetch entry corresponding to the new region, and in response to determining that the prefetch lookup table means stores the target prefetch entry, prefetching said at least one block identified by the target prefetch entry.

20. An instruction prefetching method for a data processing apparatus comprising a prefetch lookup table configured to store a plurality of prefetch entries, each prefetch entry corresponding to a region of a memory address space and identifying at least one block of one or more cache lines within the region from which an instruction was accessed in an instruction cache by processing circuitry on a previous occasion;
the method comprising:
detecting, by prefetch circuitry, based on a program counter, whether an instruction to be executed by the processing circuitry is from a new region of the memory address space; and
in response to detecting based on said program counter that said instruction to be executed is from said new region of the memory address space:
determining, by the prefetch circuitry, whether the prefetch lookup table stores a target prefetch entry corresponding to the new region; and
in response to determining that the prefetch lookup table stores the target prefetch entry, prefetching, by the prefetch circuitry, said at least one block identified by the target prefetch entry.

\* \* \* \* \*